(12) United States Patent
Liang

(10) Patent No.: US 9,030,152 B2
(45) Date of Patent: May 12, 2015

(54) CHARGING SYSTEM AND CHARGING METHOD

(75) Inventor: Houxing Liang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 252 days.

(21) Appl. No.: 13/580,189

(22) PCT Filed: May 17, 2011

(86) PCT No.: PCT/CN2011/074153
§ 371 (c)(1),
(2), (4) Date: Aug. 21, 2012

(87) PCT Pub. No.: WO2011/160510
PCT Pub. Date: Dec. 29, 2011

(65) Prior Publication Data
US 2013/0082638 A1 Apr. 4, 2013

(30) Foreign Application Priority Data

Jun. 25, 2010 (CN) .......................... 2010 1 0219277

(51) Int. Cl.
*H02J 7/00* (2006.01)
*H01M 10/44* (2006.01)
(Continued)

(52) U.S. Cl.
CPC .............. *H02J 7/0068* (2013.01); *H01M 10/44* (2013.01); *H01M 10/48* (2013.01); *H01M 2010/4278* (2013.01); *H02J 2007/0062* (2013.01); *H02J 2007/0096* (2013.01); *H02J 7/0022* (2013.01); *H02J 7/0054* (2013.01); *H02J 7/0055* (2013.01); *H02J 2007/0001* (2013.01); *Y02B 40/90* (2013.01)

(58) Field of Classification Search
CPC ...................................................... H02J 7/0068
USPC ................................................. 320/103, 107
See application file for complete search history.

(56) References Cited

U.S. PATENT DOCUMENTS 5,327,482 A * 7/1994 Yamamoto .................... 455/465
5,343,136 A * 8/1994 Yamaguchi et al. .......... 320/103
6,108,568 A * 8/2000 Lebrun et al. ................. 455/573

(Continued)

FOREIGN PATENT DOCUMENTS

CN        101009745 A        8/2007
CN        201341029 Y        11/2009

(Continued)

OTHER PUBLICATIONS

International Search Report for PCT/CN2011/074153 dated Jun. 20, 2011.

*Primary Examiner* — Sun Lin
(74) *Attorney, Agent, or Firm* — Ling and Yang Intellectual Property

(57) ABSTRACT

The present invention discloses a charging system, and the system comprises: a base which charges a mobile terminal or an own base battery and is connected with the mobile terminal and a base charger respectively; a mobile terminal control module which controls the base to charge the base battery after fully charging the mobile terminal, wherein the mobile terminal control module is located in the mobile terminal and connected with the base. A charging method is also disclosed by the present invention, and adopting the system and the method of the present invention can improve the charging efficiency and prevent the over-discharge of the base battery.

15 Claims, 2 Drawing Sheets

(51) Int. Cl.
*H01M 10/48* (2006.01)
*H01M 10/42* (2006.01)

(56) References Cited

U.S. PATENT DOCUMENTS

| | | | | |
|---|---|---|---|---|
| 6,111,389 | A * | 8/2000 | Aranovich et al. | 320/150 |
| 6,490,351 | B1 * | 12/2002 | Roberts | 379/452 |
| 6,794,849 | B2 * | 9/2004 | Mori et al. | 320/107 |
| 8,847,557 | B2 * | 9/2014 | Park et al. | 320/137 |
| 2007/0080663 | A1 | 4/2007 | Obering | |
| 2008/0106232 | A1 | 5/2008 | Idzik et al. | |
| 2008/0224661 | A1 | 9/2008 | Onose | |
| 2009/0128086 | A1 | 5/2009 | Lee | |

FOREIGN PATENT DOCUMENTS

| | | |
|---|---|---|
| CN | 101882701 A | 11/2010 |
| GB | 2386005 A | 9/2003 |
| WO | 03069761 A1 | 8/2003 |

\* cited by examiner

CHARGING SYSTEM AND CHARGING METHOD

TECHNICAL FIELD

The present invention relates to the field of power management of a mobile terminal, and in particular, to a charging method and a charging system.

BACKGROUND OF THE RELATED ART

With the continuous development of a mobile terminal, the volume of the mobile terminal is also getting smaller and smaller, and it will also become a trend that originally the original common functions of the mobile terminal are transferred to the base, for example, the majority of smart phones cancel a full keyboard function, and the full keyboard input function can be provided on the base; alternatively, since the supply of the space of the audio equipment in the mobile terminal is small to cause the limited sound efficiency, better audio equipment is provided through the base. In order not to affect the standby time of the mobile terminal, the power sources of the new equipment should be provided by a dedicated battery, that is a base battery, furthermore there is a charging circuit for the base battery.

In the existing technology, there are generally two cases for the base to charge the mobile terminal and the own base battery. The first one is that the base with a base charger is connected with the mobile terminal, and when the mobile terminal is charged, the state of being charged will be maintained until the base is separated from the mobile terminal artificially, and then the base charger will charge the base battery. The second one is that the base with the base charger charges the base battery as well as the mobile terminal battery at the same time, thus resulting in a very low efficiency and too long charging time. In addition, the base will keep a charging state when charging the mobile terminal via the own base battery, so that the base battery is prone to the over-discharge phenomenon.

SUMMARY OF THE INVENTION

In view of this, the main purpose of the present invention is to provide a charging method and charging system, which can improve the charging efficiency and further prevent the over-discharge of the base battery.

In order to achieve the aforementioned purpose, the technical scheme of the present invention is implemented as follows.

The present invention provides a charging system, and the system comprises:

a base, which charges a mobile terminal or own base battery and is connected with the mobile terminal and a base charger respectively;

a mobile terminal control module which controls the base to charge the base battery after the mobile terminal is fully charged, wherein the mobile terminal control module is located in the mobile terminal and connected with the base.

In the above scheme, the system further comprises: a mobile terminal dual-channel selection switch which selects a channel to charge the mobile terminal and is connected with the mobile terminal control module determining the type of charger and selecting a charging process; the mobile terminal dual-channel selection switch providing the channel for being connected with a Universal Serial Bus (USB) or alternating current (AC) charger and conveying a charging current, also providing the channel for being connected with a charging interface of the base and conveying the charging current.

In the above scheme, the base comprises: a charging module, which is connected with the base battery to receive the charging current sent from the base charger and send to the base battery; the base battery, which is connected with a direct current to direct current (DCDC) booster to output the charging current to the DCDC booster and is connected with the charging module to receive the charging current output by the charging module; the DCDC booster, which is connected with the base battery to receive the charging current output by the base battery and send to a base dual-channel selection switch after boosting; the base dual-channel selection switch which selects a channel to charge the mobile terminal and is connected with the base charger and DCDC booster to convey the charging current sent by the base charger or the DCDC booster and is connected with the mobile terminal via the charging interface of the base to output the charging current of the base to the mobile terminal.

In the aforementioned scheme, the mobile terminal control module is specifically used for reading a voltage of an interface which is determined to be lower than a set value of the voltage of the interface, wherein the interface is connected with the charging interface of the base; furthermore, if a USB signal line is shorted in lines connecting to an AC/USB charger, the AC charger charges the mobile terminal and the mobile terminal selects an AC charging process, and if the USB signal line is not shorted, a USB charging process is selected; the voltage of the interface is determined to be higher than the set value of the voltage of the interface, and then the base charges the mobile terminal, and a voltage of the interface connected with the base charger is read, if exceeding the set value of the voltage of the interface connected with the base charger, the base charger charges the mobile terminal, and the USB charging process or the AC charging process is selected to charge the mobile terminal, otherwise the base battery is determined to charge the mobile terminal, and the USB charging process or the AC charging process is selected to charge the mobile terminal.

In the above scheme, the mobile terminal control module is connected with the charging module for when charging the base battery is prohibited, allowing to charge the base battery if determining that a voltage of a mobile terminal battery reaches a specified value; correspondingly, the charging module is used to disconnect a channel between the base charger and the base battery when charging the base battery is prohibited, and to connect the channel between the base charger and the base battery when allowing the base battery to be charged.

In the above scheme, the mobile terminal control module is connected with the base battery for determining that a voltage of the base battery is lower than a set value of the voltage of the base battery and then disconnecting a charging circuit of the mobile terminal, when the base battery charges the mobile terminal.

The present invention also provides a charging method, which comprises:

a base that is connected with a base charger connecting with a mobile terminal, and charging the mobile terminal, and when a mobile terminal battery is fully charged, controlling the base to charge a base battery.

In the aforementioned scheme, before the base charges the mobile terminal, the method further comprises: the mobile terminal reading a voltage of an interface connected with the charger, if a voltage of an interface is higher than a set value of the voltage of the interface connected with the charger, determining that the charger charges the mobile terminal, selecting a channel connecting to the charger for charging the mobile terminal, and selecting a corresponding charging process according to the type of the charger.

In the above scheme, the mobile terminal determining the corresponding charging process according to the type of the charger comprises: the mobile terminal reading the voltage of the interface connected with the charging interface of the base, which is determined to be lower than the set value of the voltage of the interface connected with the charging interface of the base; furthermore, if a USB signal line is shorted in lines of channels connecting to an AC/USB charger, the AC charger charging the mobile terminal and the mobile terminal selecting an AC charging process, and if the USB signal line is not shorted, selecting a USB charging process; the voltage of the interface being determined to be higher than the set value of the voltage of the interface connected with the charging interface of the base, the base charging the mobile terminal, the mobile terminal reading the voltage of the interface connected with the base charger, if exceeding the set value of the voltage of the interface connected with the base charger, determining that the base charger performs charging and the USB charging process or the AC charging process is selected; if less than set value of the voltage of the interface connected with the base charger, determining that the base battery performs charging and the USB charging process or the AC charging process is selected.

In the above scheme, after determining that the base charger performs charging, the method further comprises: the mobile terminal sending information for prohibiting charging the base battery to the base, so as to prevent the base charger from charging the base battery, and after the mobile terminal is fully charged, sending information for allowing to charge the base battery to the base, the base charger charging the base battery.

In the above scheme, after determining that the base battery performs charging, the method further comprises: the mobile terminal detecting a voltage of the base battery, and determining that the battery voltage is lower than a set value of the voltage of the base battery, disconnecting a charging circuit.

It can be seen that, adopting the charging method and charging system of the present invention will prohibit charging the base battery when the base connected with the base charger charges the mobile terminal, and the base battery is not be charged until the mobile terminal is fully charged, thus effectively improving the charging efficiency. In addition, in the scheme of the present invention, when the base battery charges the mobile terminal, the power of base battery is monitored in real time so as to prevent the over-discharge of the base battery.

PREFERRED EMBODIMENTS OF THE PRESENT INVENTION

The basic idea of the present invention is that: a base is connected with a mobile terminal and a base charger respectively, and it is used for charging the mobile terminal; the base is controlled to charge the base battery after the mobile terminal is fully charged, wherein the base charging the mobile terminal comprises that the base provides a channel for the base charger charging the mobile terminal, and the base charging the base battery comprises that the base provides a channel for the base charger charging the base battery.

Figure 1:
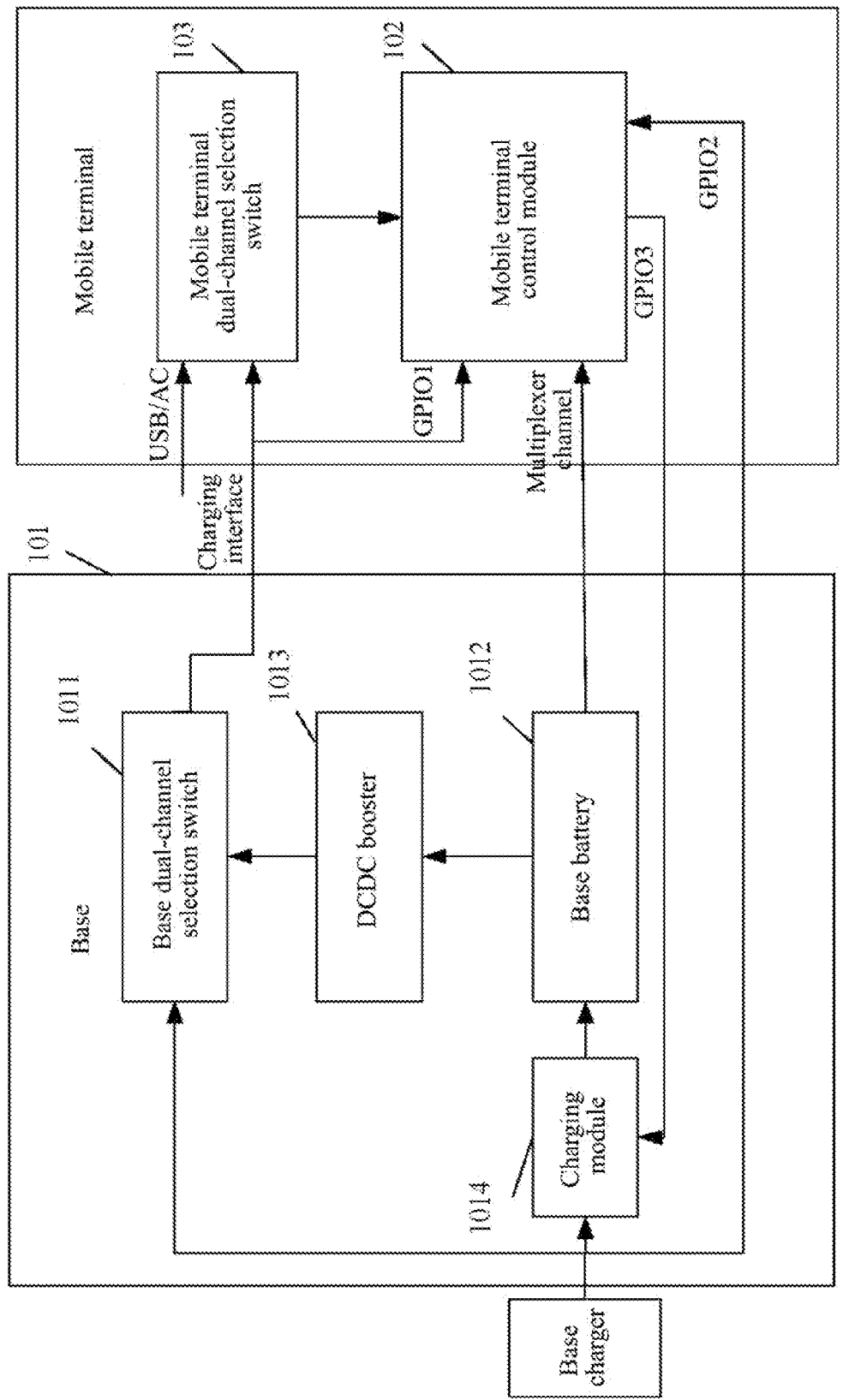
FIG. 1 is a composition schematic diagram of a system to implement charging according to the present invention.

In the following, the present invention will be illustrated in detail through accompany drawings and specific embodiments, and a charging system as shown in FIG. 1, comprises:

a base 101, which is connected with a mobile terminal as well as a base charger respectively, and is used for charging the mobile terminal or an own base battery 1012;

a mobile terminal control module 102, which is used to control the base 101 to charge the base battery 1012 after determining that the mobile terminal is fully charged.

The System Further Comprises:

a mobile terminal dual-channel selection switch 103, providing a channel connecting the mobile terminal with a Universal Serial Bus (USB)/Alternating Current (AC) charger, wherein, the channel includes four lines which are respectively a power line, a USB+ signal line, USB− signal line as well as a grounding line; alternatively, it providing a channel connecting the mobile terminal with a charging interface of the base 101, selecting the channel connecting to the charger to charge the mobile terminal; it being connected with the mobile terminal control module 102, so as to output the charging current to the mobile terminal control module 102, wherein, said selecting the channel connecting to the charger to charge the mobile terminal comprises: reading the channel voltage, and then determining that the channel connects to the charger and the channel is connected to charge the mobile terminal if the channel voltage is greater than the set value, that is the channel voltage is a high level, wherein, the set value can be configured according to the requirement, such as 1.8 v.

Correspondingly, the mobile terminal control module 102 connected with the mobile terminal dual-channel selection switch 103 reads the voltage of the interface connected with the charger; if the voltage is greater than the set value, the voltage of the interface is a high level and it is determined that the charger is accessed, and the type of the charger is further determined and a corresponding charging process is selected, wherein, the set value can be configured according to the requirement, such as 3.3 v.

The base 101 specifically comprises:

a base dual-channel selection switch 1011, providing the channel connecting the mobile terminal with the base charger or the channel connecting the mobile terminal with a direct current to direct current (DCDC) booster 1013, reading the channel voltage and selecting a channel to be connected whose channel voltage is greater than the set value, that is the channel voltage is a high level, so as to charge the mobile terminal; it being connected with the mobile terminal via the charging interface of the base 101 to output the charging current to the mobile terminal, wherein, the set value can be configured according to the requirement, such as 1.8 v;

the DCDC booster 1013, which is connected with the base battery 1012 as well as the base dual-channel selection switch 1011, and it is used for outputting the charging current to the base dual-channel selection switch 1011 after boosting the voltage of the base battery 1012 to 5 v via a booster circuit, wherein, the voltage of the base battery 1012 is different according to the different specifications, generally from 3 v to 4.2 v;

the base battery 1012, which is connected with the DCDC booster 1013 and outputs the charging current to the DCDC booster 1013; connected with a charging module 1014 and used to receive the charging current of the base charger output by the charging module 1014;

the charging module 1014, which is connected with the base charger and receives the charging current output by the base charger and sends to the base battery 1012, so as to charge the base battery 1012.

The mobile terminal control module 102 is specifically used to read the voltage of an own general-purpose input/output (GPIO) 1 interface, which is connected with the channel connecting the mobile terminal dual-channel selection switch 103 with the charging interface of the base 101, and if the voltage exceeds the set value of the voltage of the interface connected with the charging interface of the base, it is the base 101 that charges the mobile terminal, and the voltage of the interface connected with the base charger, namely the voltage of GPIO2 interface, is continued to be read, if the set value of the voltage of the interface connected with the base charger is exceeded, it is determined that the base 101 charges the mobile terminal via the base charger, and a USB charging process or AC charging process is selected, generally the AC charging process is selected by default to charge the mobile terminal; otherwise, it is the base battery 1012 of the base 101 that charges the mobile terminal, and the USB charging process or AC charging process is selected, generally the AC charging process is selected by default to charge the mobile terminal.

If the voltage of the GPIO1 interface is less than the set value of the voltage of the interface connected with the charging interface of the base, then the USB/AC charges the mobile terminal; if two lines of the USB+ and USB− are shorted together, that is there is no voltage difference between the two lines, then the AC charger charges the mobile terminal and the AC charging process is selected, otherwise, it is determined that the mobile terminal is charged via the USB lines and the USB charging process is selected.

The mobile terminal control module 102 is specifically used to forbid the charging module 1014 to charge the base battery 1012 and send information for prohibit charging the base battery 1012 to the charging module 1014, when determining that the base charger performs charging; the voltage of the mobile terminal battery is monitored in real time, and after reaching the specific value, that is the mobile terminal is fully charged, the charging channel is disconnected, and then the charging module 1014 is allowed to charge the base battery 1012 and information for allowing to charge the base battery 1012 is sent to the charging module 1014; there are different configurations of the specific value according to different manufacturers.

Correspondingly, the charging module 1014 disconnects the channel between the base charger and the base battery 1012 after receiving the information for prohibiting charging the base battery 1012 sent by the mobile terminal control module 102; and it connects the channel between the base charger and the base battery 1012 after receiving the information for allowing to charge the base battery 1012.

The mobile terminal control module 102 is specifically used to determine that the base battery 1012 charges the mobile terminal and monitor the voltage of the base battery 1012 via a multiplexer channel (MPP) interface, and if the voltage of the base battery 1012 is determined to be lower than the set value of the voltage of the base battery 1012, wherein the set value can be configured according to the requirement, such as 3.3 v, the voltage of the base battery 1012 is considered to be too low, thus the charging circuit of the mobile terminal is disconnected.

Figure 2:
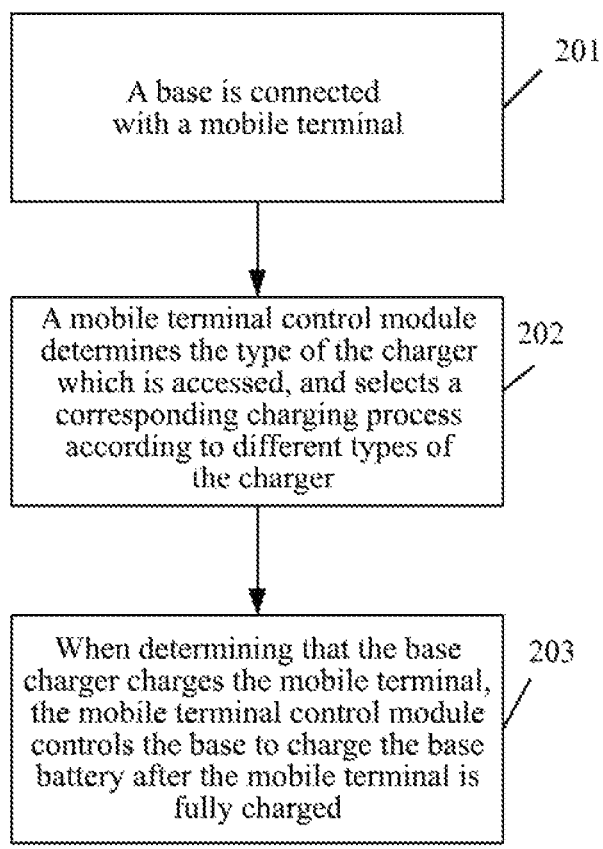
FIG. 2 is a flow chart of a method to implement charging according to the present invention.

The present invention also provides a charging method as shown in FIG. 2, and the specific process is as follows.

In step 201, a base is connected with a mobile terminal.

The base is connected with the mobile terminal via a charging interface, and a base dual-channel selection switch selects a channel whose level is high for connection to charge the mobile terminal when charging the mobile terminal, and the base dual-channel selection switch provides a channel connecting the mobile terminal with a base charger as well as a channel connecting to a DCDC booster which is connected with a base battery, and the voltages of the two channels are read, and if there is a channel connecting to the charger, the voltage of the channel will be pulled up, and the channel whose voltage is higher than a set value of the channel voltage, that is the level is high, is selected for connection, and the set value can be configured according to the requirement, such as 1.8 v, wherein, the DCDC booster is used to boost the voltage of the base battery and output the charging current to the base dual-channel selection switch.

In step 202, a mobile terminal control module determines the type of the charger that is accessed, and selects a corresponding charging process according to the different type of the charger; the type of the charger includes a USB line charger, an AC charger, a base charger and a base battery.

The mobile terminal control module judges whether there is a charger connected with the mobile terminal or not by reading the voltage of the contact of the connection of the mobile terminal control module and the charger, and if the contact voltage is lower than a set value, that is the contact voltage is a low level, it means that there is no charger connected with the mobile terminal; if the contact voltage is higher than the set value, it means that there is a charger connected with the mobile terminal, and the set value can be configured according to the requirement, such as 3.3 v. A mobile terminal dual-channel selection switch selects a channel whose level is high for connection, so as to charge the mobile terminal battery; the mobile terminal dual-channel selection switch provides a channel connecting the mobile terminal control module with the USB/AC charger as well as a channel connecting the mobile terminal control module with the charging interface of the base, and it reads the voltages of the two channels and selects a channel whose level is high, that is a channel connecting to a charger, for connection, and the charging current of the charger is output to the mobile terminal control module, wherein the channel connecting the mobile terminal dual-channel selection switch with the USB/AC includes four lines which are respectively a power line, a USB+ signal line, USB− signal line as well as a grounding line. The mobile terminal control module determines the type of the charger and selects the corresponding charging process according to the type of the charger, and the process specifically comprises: the mobile terminal control module reads the voltage of the own GPIO1 interface which is attached to the channel connecting the mobile terminal dual-channel selection switch with the charging interface of the base, and the voltage is a low level if lower than a set value of the voltage of the interface connected with the charging interface of the base, and it is the USB/AC that charges the mobile terminal; furthermore, since both the USB+ line and the USB− line of the AC charger end are shorted, the AC charger charges the mobile terminal if two lines of the USB+ and USB− are shorted together, that is there is no voltage difference between two lines, and the mobile terminal control module selects the AC charging process to perform charging; the mobile terminal is charged through the USB line if two lines are not shorted, and the mobile terminal control module selects the USB charging process to perform charging, wherein, both the AC charging process and the USB charging process are the same as the charging process in the existing technology, and the difference lies in the difference of the current limiting of the charging process, for example the current limiting of the USB charging process is 500 mA, and the current limiting of the AC charging process is 1 A.

It is the base that charges the mobile terminal if the voltage of the GPIO1 interface is greater than the set value of the voltage of the interface connected with the charging interface of the base, and the mobile terminal control module continues to read the voltage of the GPIO2 interface of the connection of the mobile terminal control module and the base charger, and the base charger charges the mobile terminal if the voltage of the GPIO2 interface is greater than the set value of the voltage of the interface connected with the base charger, and the mobile terminal control module can select the USB charging process or the AC charging process to charge the mobile terminal as long as the current limiting is performed on the charging current at the mobile terminal side, and the mobile terminal is generally charged in accordance with the AC charging process; if the voltage of the GPIO2 interface is less than the set value of the voltage of the interface connected with the base charger, the base battery charges the mobile terminal, and the mobile terminal control module can select the USB charging process or the AC charging process to charge the mobile terminal as long as the current limiting is performed on the charging current at the mobile terminal side, and the mobile terminal is generally charged in accordance with the AC charging process; the mobile terminal control module monitors the voltage of the base battery via a MPP interface, and said monitoring comprises: the mobile terminal control module reads the voltage of base battery in real time via the MPP, if the voltage of base battery is lower than the set value of the voltage of base battery, wherein, the set value can be configured according to the requirement, such as 3.3 v, and if the voltage of base battery is lower than 3.3 v, the voltage of base battery is so low that the mobile terminal control module disconnects the charging circuit to prevent the over-discharge of the base. Wherein, the set values of the GPIO1 interface as well as the GPIO2 interface can be configured according to the requirement, such as 1.8 v.

In step 203, when determining that the base charger charges the mobile terminal, the mobile terminal control module controls the base to charge the base battery after the mobile terminal is fully charged.

The mobile terminal control module determines that the base charger charges the mobile terminal and sends the information for prohibiting charging the base battery to a charging module of the base via a GPIO3 interface of the mobile terminal control module; the charging module is used to connecting the base charger with the base battery and disconnect the connection between the base charger and the base battery after receiving the information for prohibiting charging the base battery sent by the mobile terminal control module.

The mobile terminal control module reads the voltage of the mobile terminal battery in real time, the mobile terminal battery has been fully charged if the voltage of the mobile terminal battery reaches a specific value which can be configured differently according to different manufacturers and is generally 4.2 v; the mobile terminal control module disconnects the charging channel to stop charging the mobile terminal battery, and it sends the information for allowing to charge the base battery to the charging module, and the charging module connects the channel between the base charger and the base battery after receiving the information, and then the base charger charges the base battery.

The above description is only the preferred embodiments of the present invention, and is not intended to limit the protection scope of the present invention. All modifications, equivalents and improvements and so on, which are made without departing from the spirit and essence of the present invention, should be included in the protection scope of the present invention.

What is claimed is:

1. A charging system, comprising:
    a base, which is configured to charge a mobile terminal or a base battery in the base and to be respectively connected with the mobile terminal and a base charger; and
    a mobile terminal control module, which is configured to control the base to charge the base battery after a mobile battery in the mobile terminal is fully charged, to be located in the mobile terminal and to be connected with the base.

2. The charging system of claim 1, wherein the charging system further comprises:
    a mobile terminal dual-channel selection switch which is configured to select a channel to charge the mobile terminal and is connected with the mobile terminal control module which is also configured to determine a type of a charger and select a charging process;
    the mobile terminal dual-channel selection switch, which is configured to provide a channel for being connected with a Universal Serial Bus (USB) charger or alternating current (AC) charger and for conveying a charging current, and also configured to provide a channel for being connected with a charging interface of the base and for conveying the charging current.

3. The charging system of claim 2, wherein the base comprises:
    a charging module, which is connected with the base battery to receive the charging current received from the base charger and send the charging current to the base battery;
    the base battery is connected with a direct current to direct current (DCDC) booster to output the charging current to the DCDC booster; and the base battery is connected with the charging module to receive the charging current output by the charging module;
    the DCDC booster, which is connected with the base battery to receive the charging current output by the base battery and send the charging current to a base dual-channel selection switch after being boosted;
    the base dual-channel selection switch, which is configured to select a channel to charge the mobile terminal and is connected with the base charger and the DCDC booster to convey the charging current sent by the base charger or the DCDC booster, is connected with the mobile terminal via the charging interface of the base to output the charging current of the base to the mobile terminal.

4. The charging system of claim 3, wherein,
    the mobile terminal control module is specifically configured to: read a voltage of an interface which is connected with the charging interface of the base and determine if the voltage of the interface is lower than a set value of the voltage of the interface; furthermore, if a USB signal line is shorted in lines connecting to the AC/USB charger, the AC charger charges the mobile terminal and the mobile terminal selects an AC charging process, and if the USB signal line is not shorted, a USB charging process is selected; and
    the voltage of the interface is determined to be higher than the set value of the voltage of the interface, and the base charges the mobile terminal, and a voltage of an interface connected with the base charger is read, and if the voltage of the interface is exceeding a set value of the voltage of the interface connected with the base charger, the base charger charges the mobile terminal, and the USB charging process or the AC charging process is selected to charge the mobile terminal, otherwise the base battery is determined to charge the mobile terminal, and the USB charging process or the AC charging process is selected to charge the mobile terminal.

5. The charging system of claim 4, wherein,
the mobile terminal control module is connected with the charging module for allowing to charge the base battery, and if it is determined that a voltage of a mobile terminal battery reaches a specified value when charging the base battery is prohibited;
correspondingly, the charging module is configured to disconnect a channel between the base charger and the base battery, when charging the base battery is prohibited; and to connect the channel between the base charger and the base battery, when allowing the base battery to be charged.

6. The charging system of claim 4, wherein,
the mobile terminal control module is connected with the base battery for determining that a voltage of the base battery is lower than a set value of the voltage of the base battery and then disconnecting a charging circuit of the mobile terminal, when the base battery charges the mobile terminal.

7. The charging system of claim 1, wherein the base comprises:
a charging module, which is connected with the base battery to receive the charging current received from the base charger and send the charging current to the base battery;
the base battery is connected with a direct current to direct current (DCDC) booster to output the charging current to the DCDC booster; and the base battery is connected with the charging module to receive the charging current output by the charging module;
the DCDC booster, which is connected with the base battery to receive the charging current output by the base battery and send the charging current to a base dual-channel selection switch after being boosted;
the base dual-channel selection switch, which is configured to select a channel to charge the mobile terminal and is connected with the base charger and the DCDC booster to convey the charging current sent by the base charger or the DCDC booster, is connected with the mobile terminal via the charging interface of the base to output the charging current of the base to the mobile terminal.

8. The charging system of claim 7, wherein,
the mobile terminal control module is specifically configured to: read a voltage of an interface which is connected with the charging interface of the base and determine if the voltage of the interface is lower than a set value of the voltage of the interface; furthermore, if a USB signal line is shorted in lines connecting to an AC/USB charger, the AC charger charges the mobile terminal and the mobile terminal selects an AC charging process, and if the USB signal line is not shorted, a USB charging process is selected; and
the voltage of the interface is determined to be higher than the set value of the voltage of the interface, and the base charges the mobile terminal, and a voltage of an interface connected with the base charger is read, and if the voltage of the interface is exceeding a set value of the voltage of the interface connected with the base charger, the base charger charges the mobile terminal, and the USB charging process or the AC charging process is selected to charge the mobile terminal, otherwise the base battery is determined to charge the mobile terminal, and the USB charging process or the AC charging process is selected to charge the mobile terminal.

9. The charging system of claim 8, wherein,
the mobile terminal control module is connected with the charging module for allowing to charge the base battery, and if it is determined that a voltage of a mobile terminal battery reaches a specified value when charging the base battery is prohibited;
correspondingly, the charging module is configured to disconnect a channel between the base charger and the base battery, when charging the base battery is prohibited; and to connect the channel between the base charger and the base battery when allowing the base battery to be charged.

10. The charging system of claim 8, wherein,
the mobile terminal control module is connected with the base battery for determining that a voltage of the base battery is lower than a set value of the voltage of the base battery and then disconnecting a charging circuit of the mobile terminal, when the base battery charges the mobile terminal.

11. A charging method, comprising:
controlling, by a mobile terminal, a base to charge a base battery in the base when a mobile terminal battery in the mobile terminal is fully charged by the base;
wherein the base is respectively connected with the mobile terminal and a base charger.

12. The charging method of claim 11, wherein, before the base charges the mobile terminal, the charging method further comprises:
the mobile terminal reading a voltage of an interface connected with a charger, if the voltage of the interface is higher than a set value of the voltage of the interface, determining a charger to charge the mobile terminal; selecting a channel connecting to the charger for charging the mobile terminal, and selecting, by the mobile terminal, a corresponding charging process according to a type of the charger.

13. The charging method of claim 12, wherein, the mobile terminal determining the corresponding charging process according to the type of the charger comprises:
the mobile terminal reading a voltage of an interface connected with a charging interface of the base, which is determined to be lower than a set value of the voltage of the interface connected with the charging interface of the base; furthermore, if a universal serial bus (USB) signal line is shorted in lines of channels connecting to an alternative current (AC) charger or a USB charger, the AC charger charging the mobile terminal and the mobile terminal selecting an AC charging process, and if the USB signal line is not shorted, selecting a USB charging process; and
determining that the voltage of the interface is higher than the set value of the voltage of the interface connected with the charging interface of the base, the base charging the mobile terminal, the mobile terminal reading the voltage of the interface connected with the base charger, if exceeding the set value of the voltage of the interface connected with the base charger, determining that the base charger performs charging and the USB charging process or the AC charging process is selected; if less than the set value of the voltage of the interface connected with the base charger, determining that the base battery performs charging and the USB charging process or the AC charging process is selected.

14. The charging method of claim 13, wherein, after determining that the base charger performs charging, the charging method further comprises:

the mobile terminal sending information for prohibiting charging the base battery to the base, preventing the base charger from charging the base battery, and after the mobile terminal is fully charged, sending information for allowing to charge the base battery to the base, the base charger charging the base battery.

15. The charging method of claim 13, wherein, after determining that the base battery performs charging, the charging method further comprises: the mobile terminal detecting a voltage of the base battery, and determining that the voltage of the base battery is lower than a set value of the voltage of the base battery, disconnecting a charging circuit.

\* \* \* \* \*